(No Model.)
W. A. ROBERTS.
COMBINED DOUGH BOARD AND BARREL COVER.
No. 533,558. Patented Feb. 5, 1895.
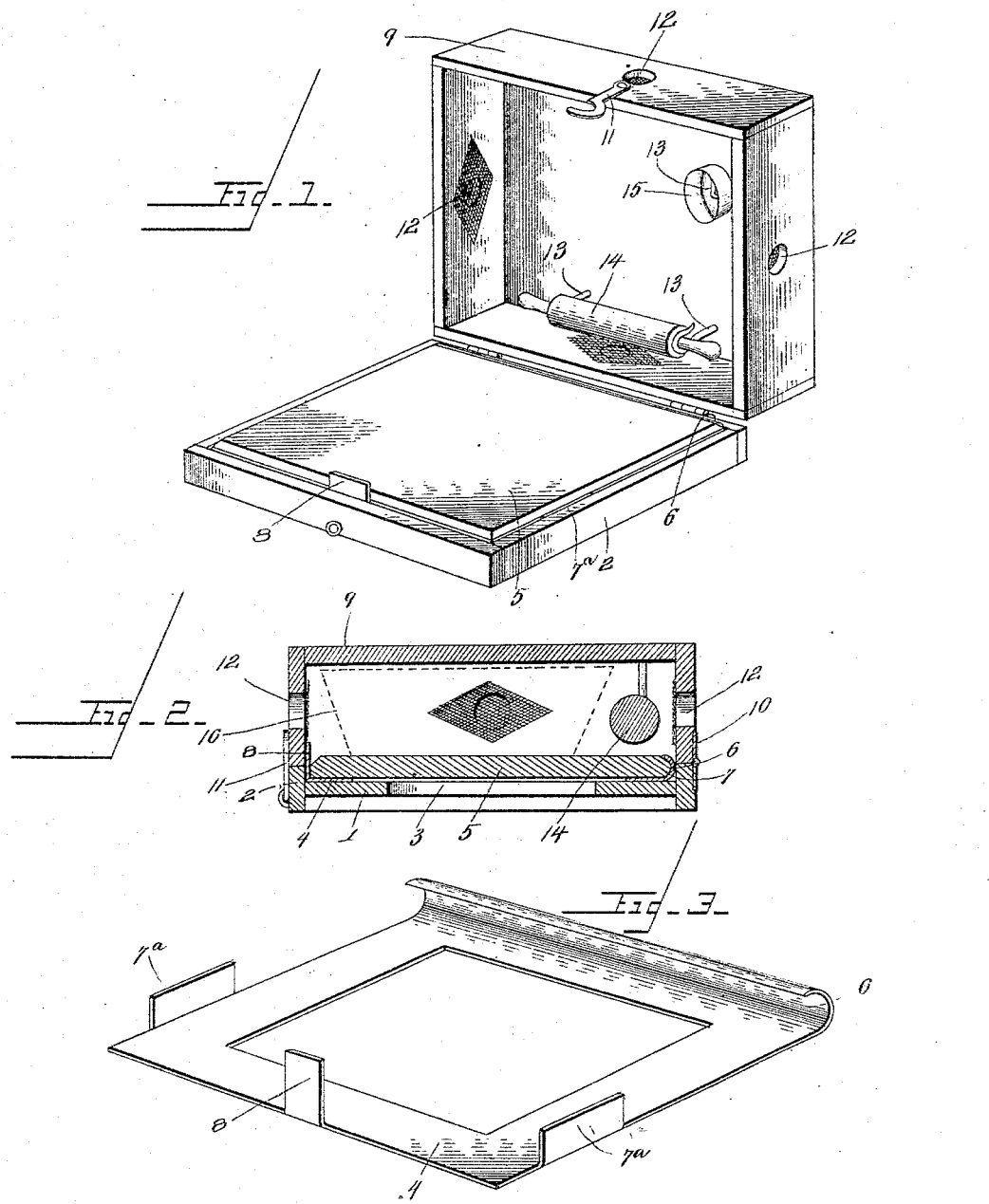
Witnesses
Thos W Riley
[signature]
Inventor
Willie A. Roberts,
By his Attorneys.
C A Snow & Co.

UNITED STATES PATENT OFFICE.

WILLIE A. ROBERTS, OF BROWNSVILLE, TENNESSEE.

COMBINED DOUGH-BOARD AND BARREL-COVER.

SPECIFICATION forming part of Letters Patent No. 533,558, dated February 5, 1895.

Application filed November 21, 1894. Serial No. 529,644. (No model.)

*To all whom it may concern:*

Be it known that I, WILLIE A. ROBERTS, a citizen of the United States, residing at Brownsville, in the county of Haywood and State of Tennessee, have invented a new and useful Combined Dough-Board and Barrel-Cover, of which the following is a specification.

This invention relates to combined dough boards and barrel covers; and it has for its object to provide a new and useful covered dough board that provides for the convenient kneading of the dough and for the complete protection and ventilation of the dough when left for a time, and also providing a convenient cover for a flour barrel in connection with which the board can be conveniently employed, and the invention also contemplates a kitchen article of the class referred to, the several parts of which are readily accessible and easily cleaned.

With these and other objects in view which will readily appear as the nature of the invention is better understood, the same consists in the novel construction, combination and arrangement of parts hereinafter more fully described, illustrated and claimed.

In the drawings:—Figure 1 is a perspective view of a combined dough board and barrel cover, the box-cover of the board being open. Fig. 2 is a vertical transverse sectional view of the combined board and cover, closed. Fig. 3 is a detail in perspective of the removable holder frame for the kneading slab.

Referring to the accompanying drawings, 1 designates a flanged base board that is surrounded at its edges by a rectangular base frame 2, projecting above and below the said board 1, to form flanges above and below the same, and said base board is provided with a centrally located hand-hole 3, that provides ready access to the interior of a flour barrel, over which the base board is adapted to be placed to form a cover therefor. By reason of the depending flanges of the base board 1, it will be obvious that when the said board is placed over the top of the barrel to form a cover therefor, the same will remain in place and will be prevented from slipping off of the barrel while in use, while the flanges projecting above the edges of the board 1, form a seat to removably receive therein a removable rectangular holder frame 4, that is adapted to hold or carry a kneading slab 5, that is preferably made of marble, inasmuch as the same can be kept constantly clean and will not sour like a wooden dough or kneading board.

The rectangular holder frame is made of suitable sheet metal and is adapted to snugly register within the top flanges of the base or base board 1, and said holder frame is provided at its rear edge with the curved or rounded back flange 6, in which is adapted to register the rear rounded edge 7, of the kneading slab 5, so that such slab will be securely retained within the holder frame, and will work easily when being elevated. The said metal rectangular holder frame 4, is further provided at its opposite side edges with oppositely located clamp ears 7ª, that engage opposite side edges of the kneading slab to insure the same against slipping when being elevated, and at its front side the said holder frame is provided with an upwardly disposed finger tab 8, that is disposed at the front edge of the kneading slab, and is simply grasped by the fingers when it is desired to elevate the slab in order to reach into the flour barrel through the hand hole 3, of the base, or when it is desired to entirely remove the slab from the flanged base.

The flanged base or base-board 1, supporting the removable slab, and holder-frame therefor, is adapted to be inclosed at the top by the hinged box cover 9. The box cover 9, is hinged at its rear side by means of the hinges 10, to one side of the flanged base or base board 1, and the side and end flanges of the cover 9, are adapted to rest on the upper edges of the rectangular base frame 2, when the cover is closed down onto the base. In its closed position the cover is fastened to the flanged base by means of a hook latch or other suitable fastener 11. The hinged box cover 9, is provided in the flanges thereof with screened circulating openings 12, that provide for a free circulation of air and at the same time exclude flies and other insects, and the said cover preferably supports within the same, hooks or other suitable hangers 13, to provide for the support of the rolling pin 14, and the biscuit cutter 15, and when the box cover is closed down onto the base the bread pan 16, shown in dotted lines, may be conveniently boxed. By reason of the construction described, it will be also obvious that when it is desired to leave the dough for a time the box cover will effectually exclude insects and will at the same time admit sufficient air to keep the dough fresh.

Changes in the form, proportion and the minor details of construction may be resorted to without departing from, the principle or sacrificing any of the advantages of this invention.

Having thus described the invention, what is claimed, and desired to be secured by Letters Patent, is—

1. In a combined dough board and barrel cover, the combination of a flanged base adapted to fit over the top of a barrel and provided with a hand-hole therein, a kneading board or slab removably fitted in said base over the hand-hole, and a cover hinged to said base, substantially as set forth.

2. In a dough board, the combination of a flanged base, a holder-frame removably fitted within said base, a kneading slab fitted within said holder-frame, and a cover hinged to said flanged base, substantially as set forth.

3. In a dough board and barrel cover combined, the combination of a flanged base having a hand-hole therein, a rectangular metal holder-frame removably fitted within said flanged base and provided with a curved back flange, opposite side clamp-ears, and a front upwardly disposed finger tab, a kneading slab fitted within said frame and provided with a rear rounded edge registering in said curved back flange, and a box-cover hinged to said flanged base, substantially as set forth.

In testimony that I claim the foregoing as my own I have hereto affixed my signature in the presence of two witnesses.

WILLIE A. ROBERTS.

Witnesses:
P. R. BRIGHT,
W. W. DUPREE.